Oct. 15, 1957  E. BERNHARDT  2,809,554
MICROSCOPE OBJECTIVE WITH LOW MAGNIFICATION FOR EPI-MICROSCOPES
Filed July 16, 1954                                      2 Sheets-Sheet 1
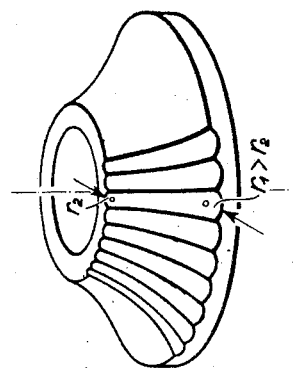
Fig. 4
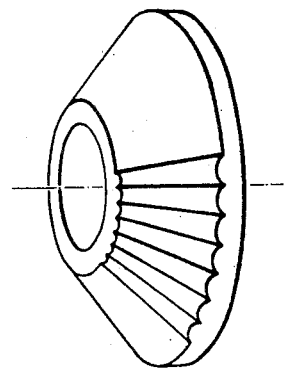
Fig. 5
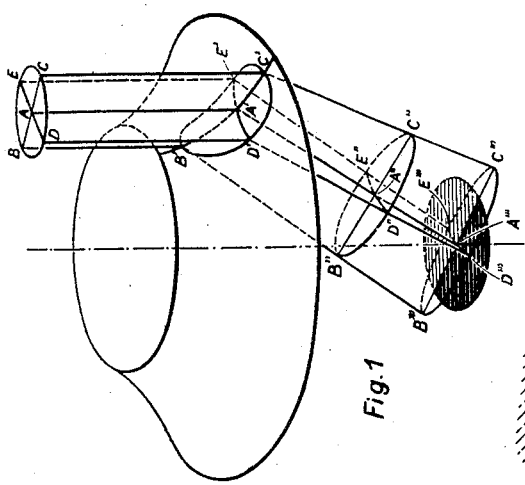
Fig. 1
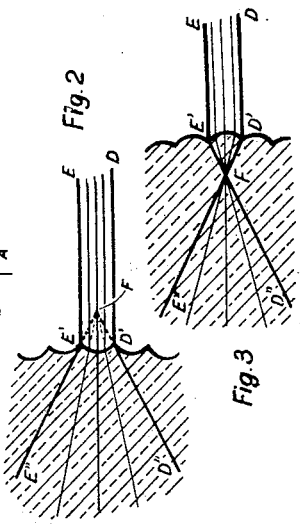
Fig. 2
Fig. 3

Oct. 15, 1957 E. BERNHARDT 2,809,554
MICROSCOPE OBJECTIVE WITH LOW MAGNIFICATION FOR EPI-MICROSCOPES
Filed July 16, 1954 2 Sheets-Sheet 2
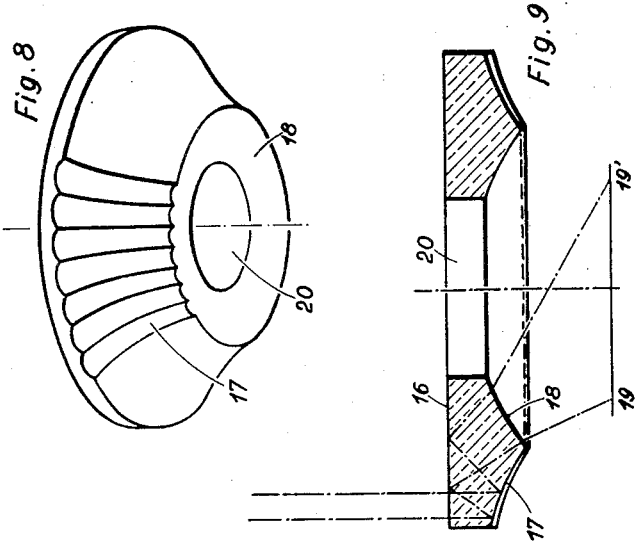
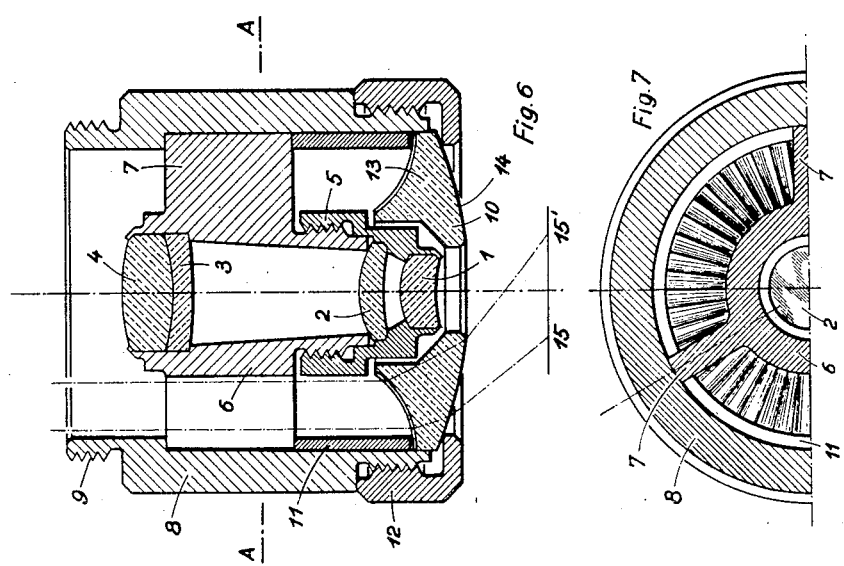

United States Patent Office 2,809,554
Patented Oct. 15, 1957

2,809,554

MICROSCOPE OBJECTIVE WITH LOW MAGNIFICATION FOR EPI-MICROSCOPES

Eugen Bernhardt, Heidenheim, Wurttemberg, Germany, assignor to Carl Zeiss, Heidenheim on the Brenz, Germany Application July 16, 1954, Serial No. 485,540

5 Claims. (Cl. 88—39)

For microscopy with reflected light, objectives are customary which are combined with a dark-field epi-condenser consisting of ring-shaped optical structural elements. These structural elements can be fashioned in different ways. Common are lenses, spherical-, paraboloid-, ellipsoid-, or cardioid-reflectors, of which in each case only one annular zone surrounding the objective proper is utilized. It is further known that the limited space relations in the objective mount of objectives with low magnitfiications as a rule forbids that a uniform illumination of large object fields comes about. Therefore it is frequently customary to effect a supplementary scattering of the light through dulling one of the optically effective surfaces of the dark-field condenser and to accept the light loss connected therewith.

Further there has become known an arrangement of a dark-field epi-condenser (cf. German patent specification 608,644 of Carl Zeiss) which includes two concentric cone-shaped annular reflecting surfaces. According to a further variety of such a condenser the conical ring-shaped surfaces are divided into a plurality of plane concentrically arranged reflecting surfaces. Such a condenser, it is true, causes deflection of the parallel illumination ray bundles incident from the image side of the microscope in the direction towards the object, but these ray bundles remain parallel in se in meridional section as well as in sagittal section. As however, a convergent fusion of rays substantially at one point is avoided, one succeeds in illuminating object fields being to some degree great.

Considerable difficulties still occurred since it is a matter of providing dark-field condensers for microscope objectives with flattened field of view. Because of the eliminated curvature of the image field these objectives possess large fields of view, which in turn make necessary the illumination of large object fields. Since as a rule the free working distances of these objectives are also shorter than those of the old objectives, especially high and difficultly met demands are made on the dark-field condensers.

Object of the present invention is a microscope objective with low magnification, in whose dark-field condenser, means are provided with whose aid a divergent expansion is supplementarily imparted to the illuminating ray bundles directed onto the object which can be effected in advantageous manner thereby that at least one aspheric optically effective surface is employed.

Two tasks are again to be fulfilled in that the supplementary divergent expansion of the illuminating rays within the object space produced by the means in accordance with the invention, must assume as well in the meridional section as also in the sagittal section, independently of one another, the values which are required for a uniform illumination of the object fields. In order to produce, in the meridional section, divergent expansion of every desired degree the shape of toric surfaces are suitably selected for the aspheric optically effective surfaces the finite radius of curvature in the meridional section is suitably dimensioned. In order to be able independently thereof to influence the divergent expansion also in sagittal section, in accordance with a further idea of the invention, optically effective surfaces of the dark-field condenser are provided with a greater number of grooves or ribs uniformly distributed over the surface in almost radial planes. Thereby the radius of curvature of the cross section of the grooves resp. ribs can vary in their longitudinal direction.

It is suitable in accordance with the invention to simultaneously apply the specified optical means for introducing divergent expansion of the illuminating ray bundles in the meridional and in the sagittal section independently of one another.

In comparison with the above described well-known condenser with cone-shaped reflecting surfaces or concentric plane reflecting surfaces the technical progress of the microscope objective combined with epi-condenser according to the present invention may be discerned. With this condenser the extension of the illuminated object space in meridional direction is at maximum equal to the projection of the height of the conical zone onto the object plane, and in sagittal direction at maximum equal to the width of the single reflecting plane surfaces. As however, with the arrangement according to the present invention the strength of curvature of the toroidal surfaces in meridional section as well as of the grooves or ribs in sagittal section are scarcely limited, one can easily succeed to illuminate the object space in meridional as in sagittal direction to an extent amounting to a multiple of the meridional height of the toroic surface and especially of the sagittal width of the grooves and the ribs resp.

The measures according to the present invention may be performed by reflecting as well as by refracting surfaces. Now it is given by the nature of refracting surfaces that the deviations and the divergent expansion of the ray bundles caused by them amount only to a fraction of those reached by similarly shaped reflecting surfaces. In spite of that also in the case that a very great expansion is wanted the appliance of non-spherical surfaces according to the present invention need not be limited to reflecting surface condenser arrangements. By employing sufficiently short radii of curvature for the non-spherical surfaces according to the invention one succeeds with advantage, even with lens condensers, to create those strong ray bundle expansion necessary for illuminating of large object areas and simultaneously to reduce the space necessary for lens condenser in comparison with that for reflecting surface condensers.

Let the invention be more fully elucidated at hand of the accompanying illustrations, of which Figs. 1 to 3 illustrate the mode of action of the mentioned aspheric surfaces, for example a toric surface, Figs. 4 and 5 two possible developments of aspheric surfaces, Figs. 6 and 7 a vertical section and a horizontal section of a microscope objective, whose dark-field condenser is provided with an aspheric refracting surface, and Figs. 8 and 9 show view and section of a dark-field condenser provided with an aspheric reflecting surface.

Let it be mentioned, that an execution form of a dark-field condenser is known and customary, which for reasons of simple production is provided with a toric annular reflector, which represents a good approach to the theoretically correct paraboloid shape. In this familiar case however, it is a matter of achieving an illumination of relatively small fields as free as possible of aberrations; the slight aberrations arising from the introduction of such a toric surface are indeed not intentional and even undesired, however, are of little consequence in so far as they are kept sufficiently small. In contrast thereto, the introduction of toric surfaces in the present case serves precisely thereto to bring about aberrations of such degree that extended object fields can be uniformly illuminated.

Let the effect of a toric lens surface on a beam be elucidated in Fig. 1, which schematically reproduces a perspective representation. Only a ring-shaped zone of the toric surface is depicted, which is to be thought of as entrance surface in a more highly refractive medium. Let the toric surface represent the function of the dark-field condenser. For the sake of simplicity of lower exit surface of the toric annular lens and the ray deflections occurring at this surface are not represented. The toric surface is traversed in its entire represented extent by a beam of almost axial parallel rays. Of this beam only a part is shown whose axis is A—A' it is bounded by the circular cross section BDCE. The axis of this beam is deflected at the toric surface in the direction A'—A" and strikes in point A''' the center of the to-be illuminated object field which is depicted hatched. The beam itself strikes the toric surface along the line B'D'C'E'. The meridional section BCC'B' of the beam strikes the toric surface along a meridian B'A'C' curved concavely upwards. Hence a fanning out takes place within the meridional section. The rays BB' and CC' which for the first proceed parallel, diverge after passage through the toric surface and strike the object plane in the points B''' and C'''. Thus the toric surface effects the deflection of a beam towards the axis, without simultaneously, like a common lens, possessing an additional converging action. Rather, the beam deflected towards the axis, is made divergent. Hence the application of toric surfaces is suitable when the illumination of large object fields simultaneously requires deflection of the beams towards the axis and their fanning out.

As Fig. 1 shows and experience confirms, the course of the beam can be influenced practically only in the meridional section by means of the toric surfaces. The sagittal section of the incident beam (represented in Fig. 1 by DD'E'E) strikes the toric surface along a line D'A'E' curved convexly upwards. After passage through the toric surface, the previously parallel bounding rays DD' and EE' because of the collective action of the section line D'A'E' are so deflected that they converge towards the points D''' and E''' in the object plane. Consequently there arises at the place of the object an elongated, approximately elliptical, light figure, whose meridional extension B''' C''' indeed adequately covers the to-be illuminated object field (hatched surface), while the extension in sagittal direction D''' E''' still leaves something to be desired.

In order to still more completely attain the pursued object, it is recommendable to so influence the dispersion exclusively in the sagittal section, that a divergent beam also in the sagittal section illuminates the entire width of the object field. According to experience this does not succeed through sole use of rotation symmetrical surfaces. To attain this goal the further measure serves that one of the optically effective surfaces of the dark-field condenser, namely suitably the toric or conical surface, is provided with grooves running in radial planes, which suitably receive a deepened cross section profile like the arc of a circle. The grooves act like a grating of cylindrical lenses, with which the lens surface is covered in radial direction. For the rest, it is immaterial for the action of this means, whether the lens grating applied on the lens surface consists of suchlike deepened grooves, or of ribs, whose cross section profile is convex. For elucidation of the action of the lens screen, the sagittal section of Fig. 1 is represented in Fig. 2 as development in the plane of the drawing, whereby it is further assumed that the toric surface is provided with grooves proceeding radially. In place of the continuously curved section figure D'A'E' of the sagittal section with the toric surface in Fig. 1, there appears in Fig. 2 the section figure D'E' of the sagittal section with the lens screen consisting of individual segments strongly curved concave. The rays of the beam DD' to EE' running parallel in air, are so deflected in passage through the lens screen, that proceeding from the virtual focus point F they run divergent in direction D'' and E''. The same holds for the case of a screen of rib lenses, which is represented in Fig. 3. Here the parallel rays of the beam after passage through the lens screen first unite in the real focal point F, in order then to run divergent in direction D'' and E''.

Execution examples for surfaces provided with grooves or ribs are represented in Figs. 4 and 5. Fig. 4 shows a toric surface which is provided with deepened grooves, Fig. 5 a conical surface known per se with reflecting surface condenser, which is covered with elevated ribs. It is obvious that it is possible by selection of the radius of curvature of the lens screen to so dimension the spreading in the sagittal plane independently of that in the meridional plane that also the width illumination of the object field becomes adequate. To increase the uniformity of the illumination still further, the expedient serves in accordance with the invention, that the radius of curvature in the cross section profile of the grooves or ribs is made variable from the outer to the inner edge of the optical surface covered therewith. Thereby the spreading in the sagittal plane can be dimensioned for each lens zone corresponding to the requirements of uniform illumination. This expedient is represented in Fig. 4, in which the radius of the groove profile $r_1$ is greater at the outer circumference of the toric surface than the profile radius $r_2$ at the inner circumference.

Since it is materially easier to produce a divergent expansion through aberrations in the meridional section than in the sagittal section, it frequently will be unnecessary to take special measures for the meridional section, since one can already obtain, merely with definite arrangements of spherical surfaces, aberrations which are large enough to produce the desired divergence of the illuminating rays in the meridional section. In such a case it suffices to employ solely the means of grooves or ribs, to sufficiently fan out the beams also in the sagittal section. On the other hand in the case of the very large object fields of the lowest-power objectives it will be suitable to influence the meridional as well as also the sagittal section independently of one another by the aspheric surfaces fashioned in accordance with the invention. Therefore the invention provides alongside the separate application, of the toric surfaces on the one hand and of the grooves or ribs on the other hand, for a combined application of both means.

Let the relations be more fully elucidated by the execution example according to Figs. 6 and 7. The microscope objective proper, consisting of lenses 1 and 2 standing separately and cemented lenses 3 and 4, is held in two mounting sleeves 5 and 6. The mounting sleeve 6 is provided with three radial bridges 7, through which the objective proper is centered in the outer mounting sleeve 8. The mounting sleeve 8 carries, at the upper end, attachment screw thread 9 with which the objective is screwed to the vertical illuminator of the epi-microscope, either directly or with the intervention of a revolver. The outer mounting sleeve is terminated below by a dark-field condenser 10, which possesses a central boring for reception of the front lens mount 5. The dark-field condenser supports itself within against a ring 11 and from without is fastened in the mount by a threaded cap-ring 12. The approximately parallel beam produced by the vertical illuminator for dark-field illumination, enters the boring of the outer mounting sleeve facing the microscope and through the ring-shaped space between outer (8) and inner (6) mounting sleeve, arrives at the entrance surface 13 of the dark-field condenser 10 which in the execution example is fashioned as a toric surface. In the passage through the toric entrance surface and the spherically curved exit surface 14, the beam is twice deflected in direction on the axis. Thereby the spreading action of the toric surface 13 preponderates over the collective action of the spherical surface 14. Consequently the beam leaving the dark-field condenser is divergent in the meridional section represented in Fig. 6, hence in this section an object field of the extension 15—15' is illuminated.

The toric surface 13 of the dark-field condenser is (in similar fashion as the surface in Fig. 4) covered with grooves, as Fig. 7 shows. In the sagittal section, which stands vertical on the plane of the drawing of Fig. 6, therefore there likewise results a fanning out, which also in this direction effects the illumination of the entire object field.

Furthermore in accordance with the invention, the application of the grooves or ribs shall not be restricted to refracting surfaces, but can also be provided for rotation symmetrical reflecting surfaces of optional configuration, thus for example for spherical, aspherical, conical and toric reflectors. To illustrate this a reflecting condenser whose deflecting surface is covered with grooves is represented in Figs. 8 and 9 as a further execution example. Fig. 8 shows the view of the reflecting condenser obliquely from below. It can find application in an objective as represented in Fig. 6 and there replace the lens condenser 10. The section drawing represented in Fig. 9 shows the mode of action of the reflecting condenser. An almost parallel incident beam enters first through the plane entrance surface 16 into the glass body and is again reflected upwards at the back-coated reflecting layer 17. Since the reflecting surface is developed as a toric surface and provided with grooves, the beam after reflection is made divergent as well in the meridional section as also in the sagittal section. The divergent beam strikes a second time on the surface 16, now however, at angles which bring about total reflection. The beam therefore again is deflected downwards, without that the divergence undergoes a change. In conclusion the beam passes through the spherical concave-curved exit surface 18, whereby the divergence still increases and reaches the object plane, which is illuminated in an extension 19—19'. A central boring 20 of the reflecting condenser again serves for the reception of the front lens of the objective.

I claim:
1. A device for use with a microscope for dark-field illumination of large microscopic object fields by incident light, comprising in a housing attached to the microscope body tube at least one ring-shaped optical condenser element surrounding the said microscope objective system, means for directing through said condensor element a substantially parallel bundle of illuminating light rays from the image side of said microscope, said element having one of its optical surfaces curved aspherically in meridional section so as to effect in the space receiving the microscopic object to be illuminated divergent spreading of the bundle of illuminating light rays in planes containing the microscope optical-axis, and equally spaced flutes recessed in and arranged radially along said aspherically curved surface so as additionally to effect divergent spreading of the bundle of illuminating light rays also in planes perpendicular to the microscope optical axis, the width and depth of said flutes diminishing uniformly in the direction with decreasing of the radius of said ring-shaped condenser element.

2. A device for microscopic dark-field illumination according to claim 1, said flutes being recessed in said aspherically curved condenser element surface in the form of grooves.

3. A device for microscopic dark-field illumination according to claim 1, said flutes being recessed in said aspherically curved condenser element surface in the form of ribs.

4. A device according to claim 1, said aspherically curved optical surface being a refracting surface.

5. A device according to claim 1, said aspherically curved optical surface being a refracting surface.

References Cited in the file of this patent

UNITED STATES PATENTS

| | | |
|---|---|---|
| 1,799,290 | English | Apr. 7, 1931 |
| 1,951,636 | Straubel | Mar. 20, 1934 |
| 1,985,074 | Bauersfeld | Dec. 18, 1934 |
| 2,130,494 | Heine | Sept. 20, 1938 |
| 2,137,079 | Falge | Nov. 15, 1938 |
| 2,694,773 | Knopp | Nov. 16, 1954 |

FOREIGN PATENTS

| | | |
|---|---|---|
| 608,644 | Switzerland | Jan. 28, 1935 |